US008959344B2

(12) United States Patent
Gnech et al.

(10) Patent No.: US 8,959,344 B2
(45) Date of Patent: Feb. 17, 2015

(54) METHOD AND SYSTEM FOR HANDLING DEFINED AREAS WITHIN AN ELECTRONIC DOCUMENT

(75) Inventors: Thomas H. Gnech, Boeblingen (DE); Steffen Koenig, Boeblingen (DE); Enrico Mayer, Boeblingen (DE); Oliver Petrik, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/563,874

(22) Filed: Aug. 1, 2012

(65) Prior Publication Data

US 2013/0036306 A1 Feb. 7, 2013

(30) Foreign Application Priority Data

Aug. 4, 2011 (EP) .................................... 11176588

(51) Int. Cl.
*H04L 29/06* (2006.01)
*G06F 17/24* (2006.01)
*G06F 21/64* (2013.01)
*G06F 21/62* (2013.01)

(52) U.S. Cl.
CPC ................ *G06F 17/24* (2013.01); *G06F 21/64* (2013.01); *G06F 21/6209* (2013.01)
USPC ........................................................ 713/168

(58) Field of Classification Search
USPC ............................ 713/168; 715/200, 255, 770
See application file for complete search history.

(56) References Cited

U.S. PATENT DOCUMENTS 7,921,360 B1 * 4/2011 Sundermeyer et al. ....... 715/255
2003/0028774 A1 2/2003 Meka
(Continued)

FOREIGN PATENT DOCUMENTS

EP          1513075 A2      3/2006
WO      WO 02/01271 A1      1/2002
WO   WO 2008/118449 A1     10/2008

OTHER PUBLICATIONS

Combined Search Report and Examination Report issued for Great Britain Patent Application Serial No. GB1210886.6, dated Sep. 12, 2012.
(Continued)

*Primary Examiner* — Ali Abyaneh
(74) *Attorney, Agent, or Firm* — Steven Chiu, Esq.; Kevin P. Radigan, Esq.; Heslin Rothenberg Farley & Mesiti P.C.

(57) ABSTRACT

A method is provided for handling defined areas within an electronic document, which includes: marking at least one area in an electronic source document as indecomposable area which can be processed as a whole content only; generating signature data for the indecomposable area; assigning the signature data to the indecomposable area to create an indecomposable area object; storing the indecomposable object; encrypting and transmitting the indecomposable area object in response to a request of an enhanced content reader application, where the enhanced content reader application decrypts the indecomposable area object and processes the indecomposable area in an electronic target document; and generating and transmitting a protected version of the indecomposable area in response to a request of a regular content reader application, where the regular content reader application outputs the protected version of the indecomposable area in an electronic target document.

12 Claims, 12 Drawing Sheets

(56) References Cited

U.S. PATENT DOCUMENTS

| | | | |
|---|---|---|---|
| 2003/0028801 A1 | 2/2003 | Liberman et al. | |
| 2005/0240759 A1 | 10/2005 | Rubin et al. | |
| 2007/0157086 A1 | 7/2007 | Drey | |
| 2008/0059803 A1* | 3/2008 | Tung | 713/176 |
| 2008/0168277 A1 | 7/2008 | Forlenza et al. | |
| 2008/0288862 A1* | 11/2008 | Smetters et al. | 715/255 |
| 2009/0150761 A1* | 6/2009 | Sawicki et al. | 715/216 |
| 2009/0208142 A1 | 8/2009 | Tredwell et al. | |
| 2009/0292930 A1 | 11/2009 | Marano et al. | |
| 2012/0185759 A1* | 7/2012 | Balinsky et al. | 715/209 |

OTHER PUBLICATIONS

Shi, Zhu Bao, "Digital Rights Management for Electronic Documents", A Thesis Submitted for the Degree of Doctor of Philosophy School of Computing National University of Singapore, 165 pgs. (2004).

Yao et al., "A Novel Watermark Algorithm for Integrity Protection of XML Documents", IJCSNS International Journal of Computer Science and Network Security, vol. 6, No. 2B, pp. 202-207 (Feb. 2006).

Mooney et al., "Generation and Detection of Watermarks Derived from Chaotic Functions", Department of Computer Science, N.U.I. Maynooth, Maynooth, Co. Kildare, Ireland, 12 pgs. (Mar. 2012).

* cited by examiner

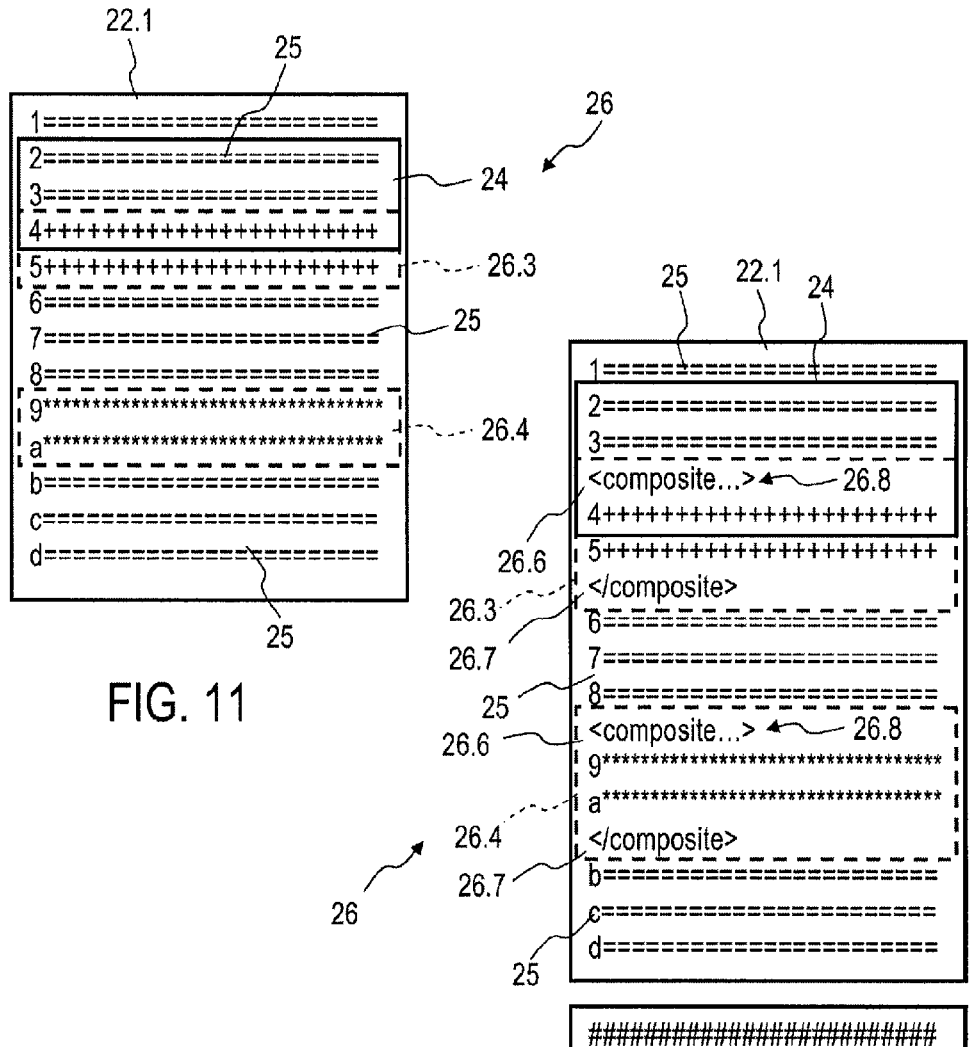
FIG. 11
FIG. 12
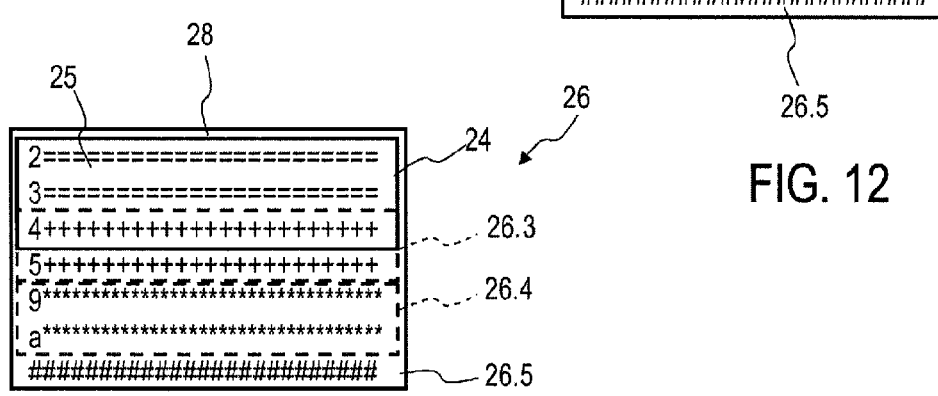
FIG. 13

US 8,959,344 B2

METHOD AND SYSTEM FOR HANDLING DEFINED AREAS WITHIN AN ELECTRONIC DOCUMENT

PRIOR FOREIGN APPLICATION

This application claims priority from European patent application number 11176588.9, filed Aug. 4, 2011, which is hereby incorporated herein by reference in its entirety.

TECHNICAL FIELD

The present invention relates in general to the field of integrity protection of an electronic publication and/or document, and in particular to a method for handling defined areas within an electronic document, and a system for handling defined areas within an electronic document. Still more particularly, the present invention relates to a data processing program and a computer program product for handling defined areas within an electronic document.

BACKGROUND

This disclosure relates to a method for copy protection of defined areas out of their context within the electronic publication and/or document. With the fast development of Extensible Markup Language (XML) and its comprehensive application, the integrity protection of electronic documents is becoming pressing. Integrity means that a composite portion of the electronic document includes its context, designation of authorship and an indication of source.

In the art, common and/or proprietary document formats (PDF) are used that prevent the user from cut and copy operations. In such documents a reuse of parts of the document is not possible. Alternatively common and/or proprietary document formats (PDF) are used that allow the user to perform cut and copy operations without limitations. In such documents easy falsification and misuse of information is possible. As an example, by pretending its originality a part of a statement of a politician can be communicated in a different context than originally stated.

In the Patent Application Publication US 2008/0288862 A1 "METHOD AND SYSTEM FOR IN-DOCUMENT MARKUP IN SUPPORT OF INFORMATION SHARING" by Smetters et al. a method and system are provided that facilitate content dissemination. During operation, the system allows a user to add a tag to a first document, wherein the tag indicates an operation to be performed on a portion of the document. The system then processes the tag and performs the operation on the document portion based on the tag. The tag can specify one or more of an action, the portion of the document, and a receiving entity corresponding to the action. Further the action can comprise one or more of a showing of, sharing of, copying of, request of comment for, and a request of approval for the document portion with respect to the receiving entity. The document portion may include a paragraph, a section, and/or a specific text location. The receiving entity can be identified by at least one of: one or more user identifiers, one or more group identifiers, one or more email addresses, one or more network addresses, and one or more pathnames. Additionally the operation may include sending the content portion to a second user. The system further receives a second document or document portion in response to the operation performed and modifies the first document based on the second document or document portion. Also the system may receive a user command which triggers the processing of the tag. The processing of the tag may be triggered based on one or more events. Further performing the operation on the document portion can involve encrypting a copy of the document portion and sending the encrypted copy to the receiving entity, and authenticating a copy of the document portion by signing the copy with a digital signature and sending the authenticated copy to the receiving entity.

The described method and system define a document portion for sharing but do not secure this shared portion from extracting parts of it out of the context by the receiver.

BRIEF SUMMARY

In accordance with an aspect of the present invention, a method is provided for handling defined areas within an electronic document. The method includes: marking at least one area in an electronic source document as indecomposable area which can be processed as a whole content only; generating signature data for the indecomposable area; assigning the signature data to the indecomposable area to create an indecomposable area object; storing the indecomposable area object; encrypting and transmitting the indecomposable area object in response to a request of an enhanced content reader application comprising at least a part of the indecomposable area, wherein the enhanced content reader application decrypts the indecomposable area object and processes the indecomposable area in an electronic target document; and generating and transmitting a protected version of the indecomposable area in response to a request of a regular content reader application, including at least a part of the indecomposable area, wherein the regular content reader application outputs the protected version of the indecomposable area in an electronic target document.

In another aspect, a system for handling defined areas within an electronic document is provided. The system includes: a content creator application, at least one enhanced content provider application, and at least one content reader application in electronic communication with the at least one enhanced content provider application. The content creator application is configured for: marking at least one area of an electronic source document as indecomposable area which can be processed as a whole content only; generating signature data for the indecomposable area; assigning the signature data to the indecomposable area to create an indecomposable area object; and storing the indecomposable area object in a content storage of at least one enhanced content provider application. The at least one content reader application is configured to request at least a part of the indecomposable area from at least one enhanced content provider application, and the at least one enhanced content provider application encrypts and transmits the indecomposable area object in case the requesting content reader application is an enhanced content reader application, wherein the enhanced content reader application decrypts the indecomposable area object and processes the indecomposable area object in an electronic document. The at least one enhanced content provider application generates and transmits a protected version of the indecomposable area in the case where the requesting content reader application is a regular content reader application, wherein the regular content reader application outputs the protected version of the indecomposable area in an electronic target document.

In a further aspect, a computer program product for handling defined areas within an electronic document is provided. The computer program product includes a computer-readable storage medium readable by a processor and storing instructions for execution by the processor for performing a method. The method includes: marking at least one area in an electronic source document as indecomposable area which can be processed as a whole content only; generating signature data for the indecomposable area; assigning the signature data to the indecomposable area to create an indecomposable area object; storing the indecomposable area object; encrypting and transmitting the indecomposable area object in response to a request of an enhanced content reader application comprising at least a part of the indecomposable area, wherein the enhanced content reader application decrypts the indecomposable area object and processes the indecomposable area in an electronic target document; and generating and transmitting a protected version of the indecomposable area in response to a request of a regular content reader application, including at least a part of the indecomposable area, wherein the regular content reader application outputs the protected version of the indecomposable area in an electronic target document.

The above, as well as additional purposes, features, and advantages of the present invention will become apparent in the following detailed written description.

BRIEF DESCRIPTION OF THE SEVERAL VIEWS OF THE DRAWINGS

One or more embodiments of the present invention, as described in detail below, are shown in the drawings, in which:

FIG. 11 is a schematic diagram of a second electronic document with a user-selected area comprising plain data and an indecomposable area (IDA), in accordance with an embodiment of the present invention;

FIG. 12 is a schematic diagram of the second electronic document shown in FIG. 11 with an indecomposable area (IDA) object created for the indecomposable area (IDA) shown in FIG. 11, in accordance with an embodiment of the present invention; and FIG. 13 is a schematic diagram of a resulting selection area comprising plain data and the indecomposable area (IDA) created for the user selected area shown in FIG. 11, in accordance with an embodiment of the present invention.

DETAILED DESCRIPTION

Figure 1:
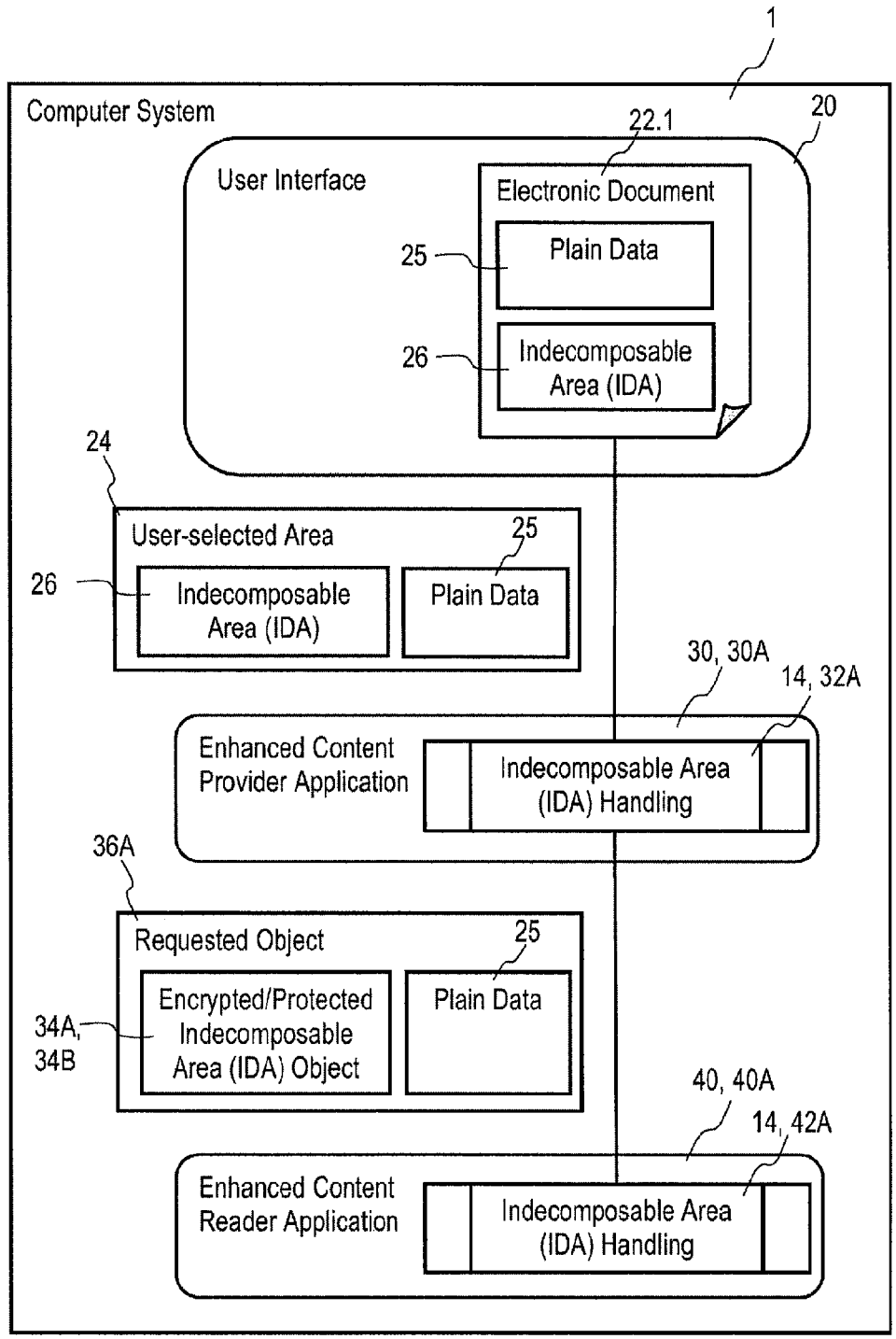
FIG. 1 is a schematic block diagram of a system for handling defined areas within an electronic document, in accordance with an embodiment of the present invention.

The technical problem underlying the present invention is to provide a method for handling defined areas within an electronic document and a system for handling defined areas within an electronic document, which are able to ensure integrity of a composite portion of an electronic publication and to solve the above mentioned shortcomings and pain points of prior art integrity protection.

According to the present invention this problem is solved by providing a method for handling defined areas within an electronic document having the features of claim 1, a system for handling defined areas within an electronic document having the features of claim 7, and a computer program product for handling defined areas within an electronic document having the features of claim 14. Advantageous embodiments of the present invention are mentioned in the subclaims.

Accordingly, in an embodiment of the present invention a method for handling defined areas within an electronic document comprises marking at least one area in an electronic source document as indecomposable area which can be processed as a whole content only; generating signature data for the indecomposable area; assigning the signature data to the indecomposable area to create an indecomposable area object; storing the indecomposable area object; encrypting and transmitting the indecomposable area object in response to a request of an enhanced content reader application comprising at least a part of the indecomposable area, wherein the enhanced content reader application decrypts the indecomposable area object and processes the indecomposable area in an electronic target document; and generating and transmitting a protected version of the indecomposable area in response to a request of a regular content reader application, comprising at least a part of the indecomposable area, wherein the regular content reader application outputs the protected version of the indecomposable area in an electronic target document.

In further embodiments of the present invention, registration data for the indecomposable area object are generated and stored at a corresponding authentication application to register the indecomposable area object, wherein registration information is added to the indecomposable area object.

In further embodiments of the present invention, an indecomposable area object is verified by generating verification data for the corresponding indecomposable area object and transmitting the verification data to the authentication application comparing the verification data with the stored registration data of the indecomposable area object and creating a verification result based on the comparison.

In further embodiments of the present invention, the signature data and/or the registration data and/or the verification data for the indecomposable area comprise at least one of an indecomposable area object identification, a creator identification, a marked area number, a total number of marked areas, and a computed checksum.

In further embodiments of the present invention, a start marker and an end marker are used to mark the at least one area in the electronic source document as indecomposable area.

In further embodiments of the present invention, additional information is added to the indecomposable area object comprising at least one of bibliography information, reference information, link information, and plain data.

In another embodiment of the present invention, a system for handling defined areas within an electronic document comprises a content creator application, at least one enhanced content provider application, and at least one content reader application in electronic communication with the at least one enhanced content provider application; where the content creator application is configured for marking at least one area in an electronic source document as indecomposable area which can be processed as a whole content only; generating signature data for the indecomposable area; and assigning the signature data to the indecomposable area to create an indecomposable area object; and storing the indecomposable area object in a content storage of at least one enhanced content provider application; wherein the at least one content reader application is configured to request at least a part of the indecomposable area from at least one enhanced content provider application; wherein the at least one enhanced content provider application encrypts and transmits the indecomposable area object in case the requesting content reader application is an enhanced content reader application, wherein the enhanced content reader application decrypts the indecomposable area object and processes the indecomposable area in an electronic target document; and wherein the at least one enhanced content provider application generates and transmits a protected version of the indecomposable area in case the requesting content reader application is a regular content reader application, wherein the regular content reader application outputs the protected version of the indecomposable area in an electronic target document.

In further embodiments of the present invention, the content creator application generates registration data for the indecomposable area object and sends the registration data to a corresponding authentication application storing the registration data in a registration database to register the indecomposable area object, and returning registration information to the content creator application adding the registration information to the indecomposable object.

In further embodiments of the present invention, the at least one enhanced content reader application verifies an indecomposable object by generating verification data for the corresponding indecomposable area object and transmitting the verification data to the authentication application comparing the verification data with stored registration data of the corresponding indecomposable area object and creating a verification result based on the comparison and returning the verification result to the at least one enhanced content reader application.

In further embodiments of the present invention, the content creator application uses at least one of an indecomposable area object identification, a creator identification, a marked area number, a total number of marked areas, and a computed checksum to create the signature data and/or the registration data, and/or the at least one enhanced content reader application uses at least one of an indecomposable area object identification, a creator identification, a marked area number, a total number of marked areas, and a computed checksum to create verification data for the indecomposable area.

In further embodiments of the present invention, the content creator application uses a start marker and an end marker to mark the at least one area in the electronic source document as indecomposable area, and adds additional information to the indecomposable area object comprising at least one of bibliography information, reference information, link information and plain data.

In further embodiments of the present invention, in a distributed environment the content creator application and the at least one enhanced content provider application are implemented on a content server, and the authentication authority is implemented on an authentication server, and the at least one content reader application is implemented on a user client.

In further embodiments of the present invention, in a local environment the content creator application is implemented as indecomposable area handling means in an enhanced source application and as part of a clipboard enhancement of an operating system, and the at least one enhanced content provider application is implemented as part of the clipboard enhancement of the operating system, and the at least one content reader application is implemented as part of the clipboard enhancement of the operating system and as indecomposable area handling means in an enhanced target application.

In another embodiment of the present invention, a data processing program for execution in a data processing system comprises software code portions for performing a method for handling defined areas within an electronic document when the program is run on the data processing system.

In yet another embodiment of the present invention, a computer program product stored on a computer-usable medium, comprises computer-readable program means for causing a computer to perform a method for handling defined areas within an electronic document when the program is run on the computer.

An idea of the present invention is to define an area in the contents of an electronic publication, such that the underlying system maintains that area in a way that the area remains in its original context and thus, refuses falsification when copied and re-used.

Embodiments of the present invention introduce an indecomposable area (IDA) which is defined using markers and/or tags. Those markers and/or tags can be implemented to fit in any markup format available e.g. HTML, Open Document Format (odf) or Microsoft Word (doc). A signature containing designation of authorship and indication of source will be created and assigned to an indecomposable area (IDA) by an indecomposable area (IDA) enabled content creation and/or authoring software. A content displayed on an electronic publication device (web browser, reader) and marked as indecomposable area (IDA) cannot be cut or copied out of its designated context. In addition modified operating system and/or environment clipboard functionality is introduced to implement handling of indecomposable area clipboard data.

Advantageously, embodiments of the present invention ensure integrity of a composite portion of an electronic publication and maintain designation of authorship and indication of source of an indecomposable area (IDA). Further, embodiments of the present invention allow a secure communication between applications which exchange indecomposable areas (IDA) of electronic publications and expose the indecomposable area (IDA) functionality via an appropriate user interface. Also, indecomposable areas (IDA) provide the copy function, recognize contextual relations among different portions of the indecomposable area (IDA), and ensure at the same time the integrity of the copied indecomposable area (IDA).

Basically a transmitted indecomposable area (IDA) object comprises a plurality of defined areas marked by a start marker and/or tag, and an end marker and/or tag; a signature, e.g. build from an object identification (ID), and a creator identification (ID); and additional information like bibliography data, reference data etc.

Figure 2:
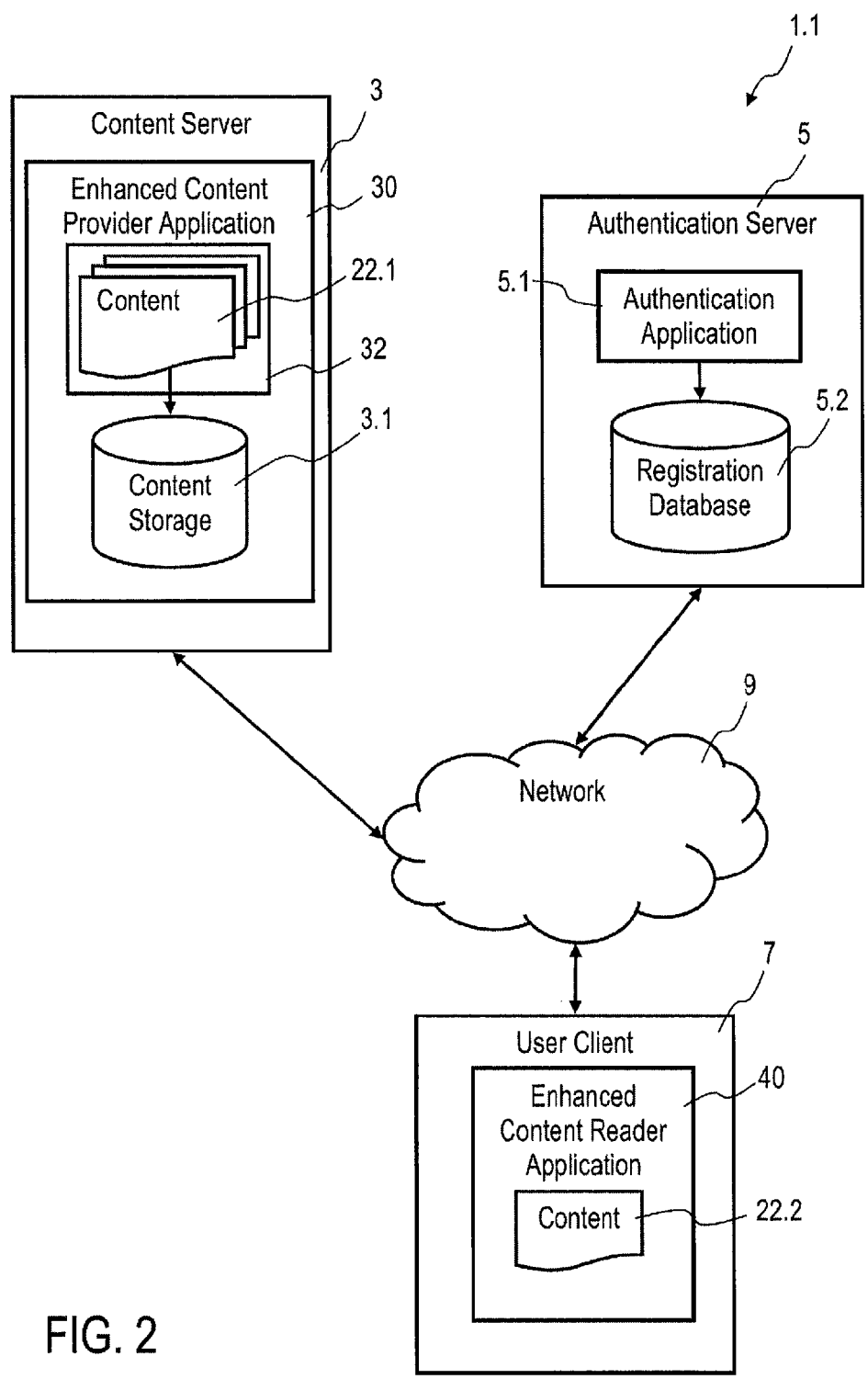
FIG. 2 is a schematic block diagram of a system for handling defined areas within an electronic document implemented in a distributed environment, in accordance with an embodiment of the present invention.
Figure 3:
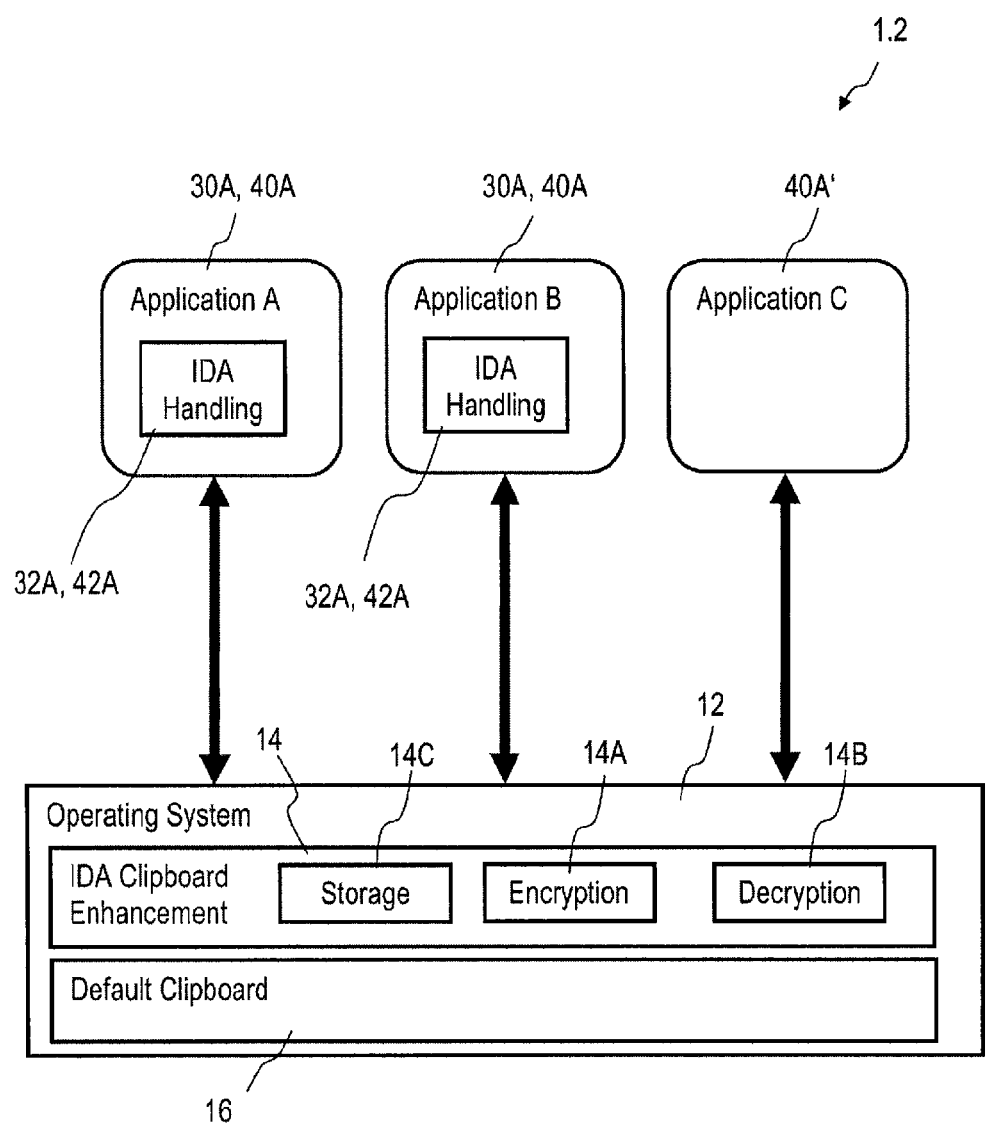
FIG. 3 is a schematic block diagram of a system for handling defined areas within an electronic document implemented in a local environment, in accordance with an embodiment of the present invention.
Figure 4:
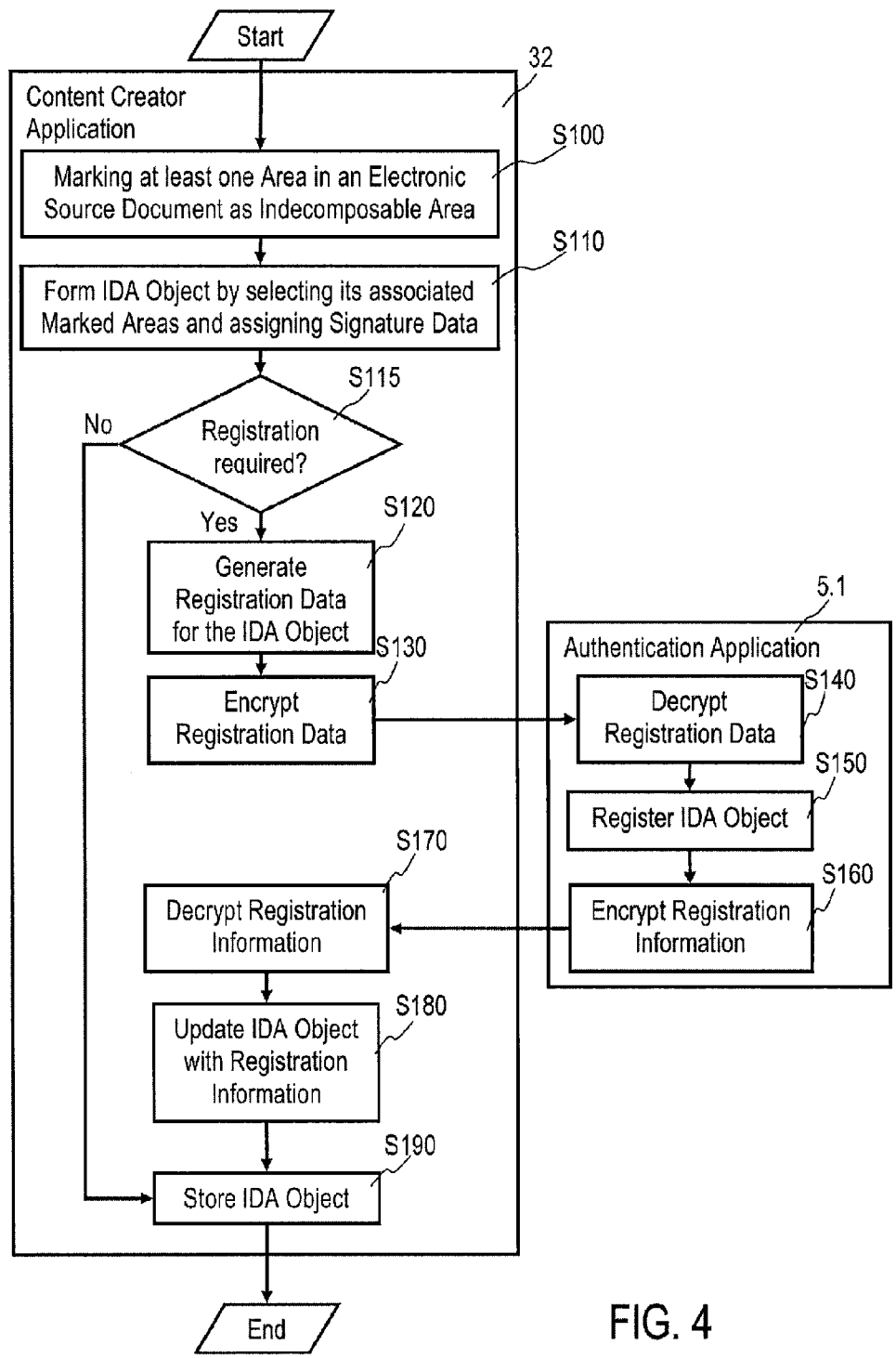
FIG. 4 is a schematic flow diagram of a creating part of a method for handling defined areas within an electronic document, in accordance with an embodiment of the present invention.
Figure 5A:
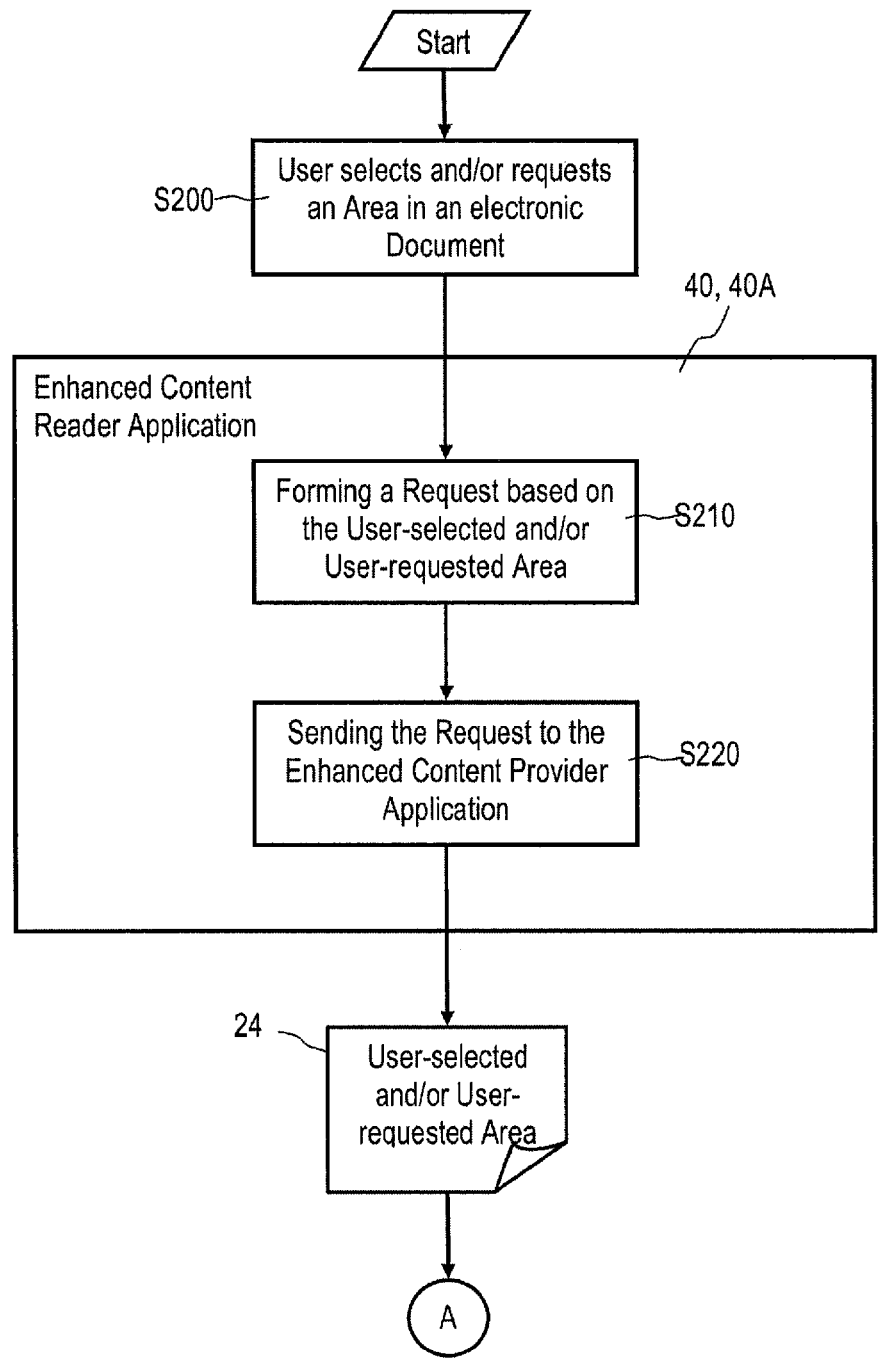
FIGS. 5a to 5c are schematic flow diagrams of a transmitting part of a method for handling defined areas within an electronic document, in accordance with an embodiment of the present invention.
Figure 5B:
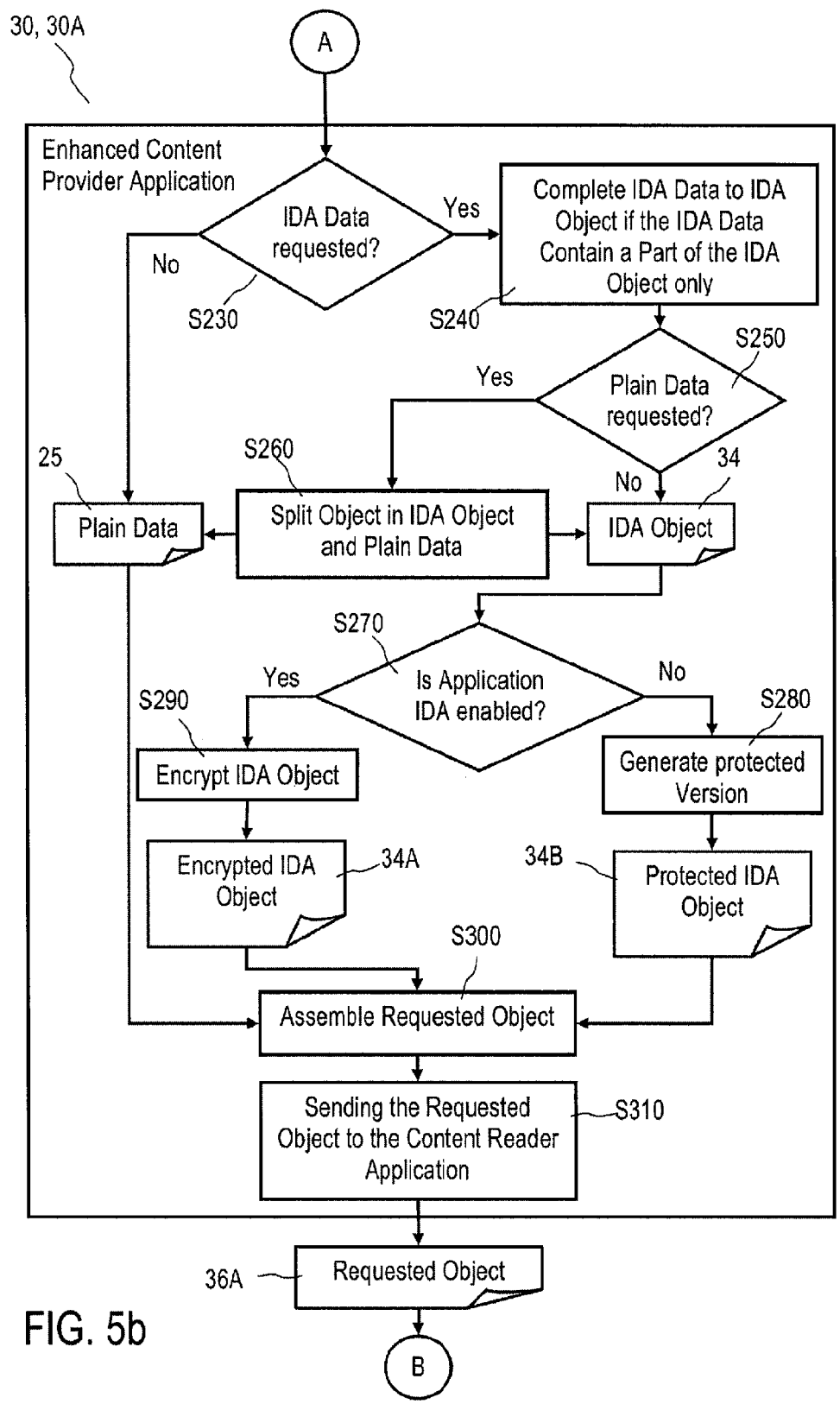
Figure 5C:
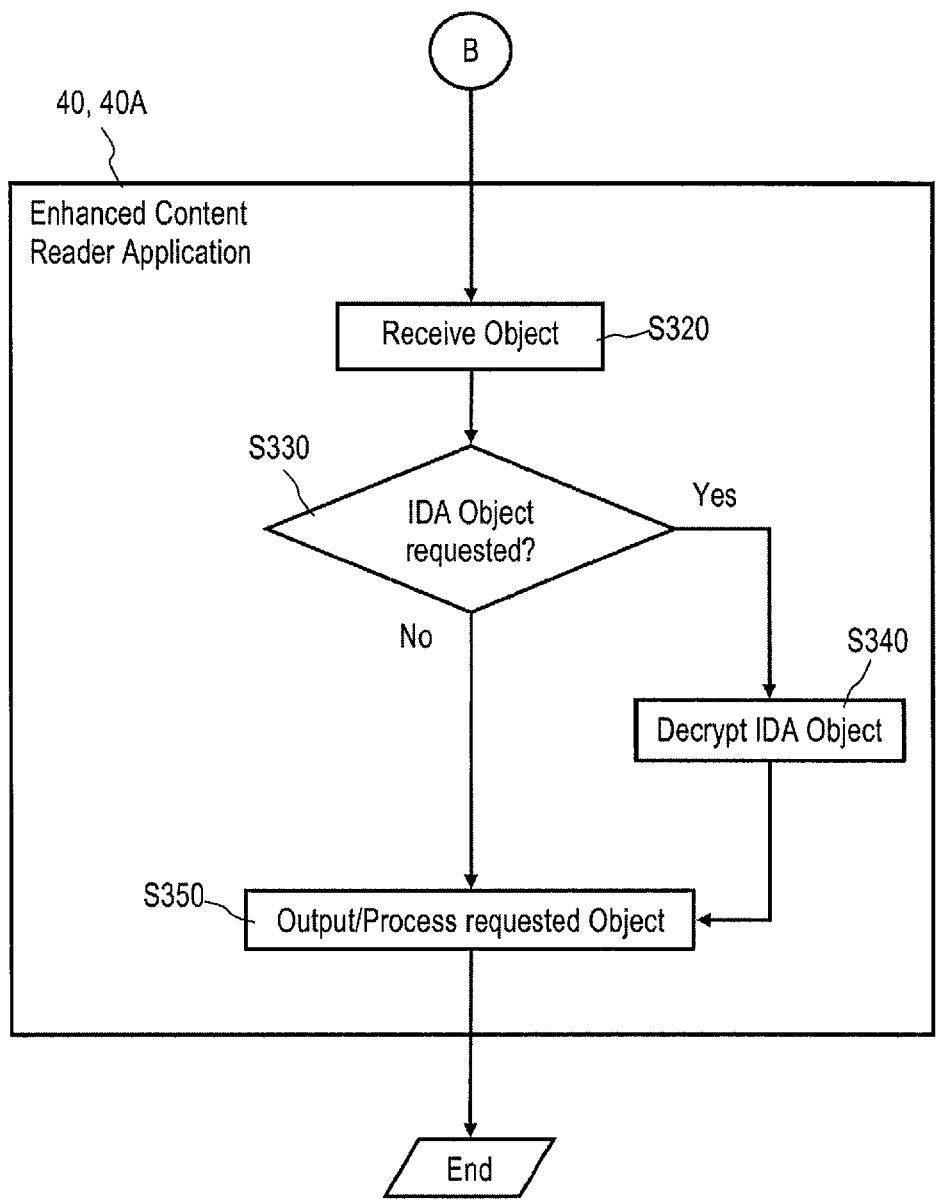
Figure 6:
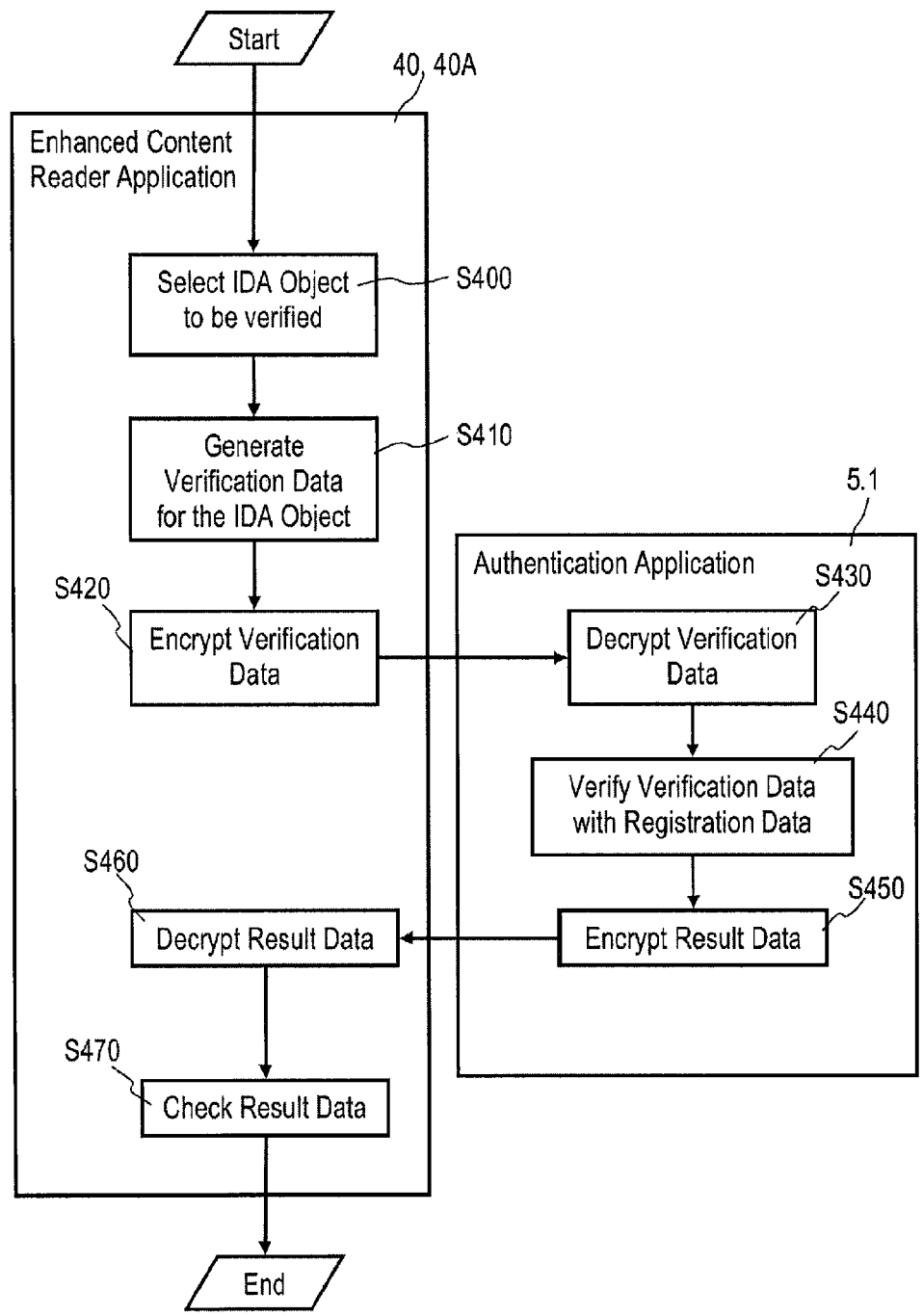
FIG. 6 is a schematic flow diagram of a verifying part of a method for handling defined areas within an electronic document, in accordance with an embodiment of the present invention.

Referring to the figures, FIG. 1 shows a system for handling defined areas within an electronic document, in accordance with an embodiment of the present invention; FIG. 2 shows a system for handling defined areas within an electronic document implemented in a distributed environment, in accordance with an embodiment of the present invention; FIG. 3 shows a system for handling defined areas within an electronic document implemented in a local environment, in accordance with an embodiment of the present invention; FIG. 4 shows a creating part of a method for handling defined areas within an electronic document, in accordance with an embodiment of the present invention; FIGS. 5a to 5c show a transmitting part of a method for handling defined areas within an electronic document, in accordance with an embodiment of the present invention; and FIG. 6 shows a verifying part of a method for handling defined areas within an electronic document, in accordance with an embodiment of the present invention.

Referring to FIGS. 1 to 3, the shown embodiments of the present invention employ a computer system 1 for handling defined areas within an electronic document comprising a content creator application 32, at least one enhanced content provider application 30, 30A, and at least one content reader application 40, 40A, 40A' in electronic communication with the at least one content provider application 30, 30A.

Referring to FIG. 2, in a distributed environment 1.1 the content creator application 32 and the at least one enhanced content provider application 30 are implemented on a content server 3, e.g. a web server, and offer access to electronic source documents 22.1. The at least one content reader application 40, e.g. a web browser, is implemented on a user client 7 and allows to access the electronic source documents 22.1 over a network 9 and to display and/or process contents of the electronic source documents 22.1 on an electronic target document 22.2. An authentication server 5 running an authentication application 5.1, e.g. a "Trusted Authority", using a corresponding registration database 5.2, is also connected to the same network 9.

Referring to FIG. 3, in a local environment 1.2 an operating system 12 and corresponding applications 30A, 40A have to be enhanced to consistently implement the handling of indecomposable areas (IDA) 26. The operating system 12 may be implemented as virtual machine or runtime environment that executes applications. Such applications 30A, 40A are enhanced by indecomposable area (IDA) handling means 32A, 42A and are called IDA-enabled. The operating system 12 is extended by an indecomposable area (IDA) clipboard enhancement 14 comprising encryption means 14A, decryption means 14B and storage means 14C to handle indecomposable areas (IDA) 26. The IDA clipboard enhancement 14 is used additionally to a default clipboard 16. In the shown embodiment IDA-enabled applications 30A, 40A and a non-IDA-enabled application 40A' interact via the operating system 12. Therefore the content creator application 32 is implemented as indecomposable area (IDA) handling means 32A in an enhanced source application 30A and as storage part 14C of the indecomposable area (IDA) clipboard enhancement 14 of the operating system 12, and the at least one enhanced content provider application 30 is implemented as encryption part 14A and storage part 14C of the indecomposable area (IDA) clipboard enhancement 14 of the operating system 12, and the at least one enhanced content reader application 40 is implemented as decryption part 14B of the indecomposable area (IDA) clipboard enhancement 14 of the operating system 12 and as indecomposable area (IDA) handling means 42A of an enhanced target application 40A.

Referring to FIG. 4, the content creator application 32 is configured for marking at least one area in an electronic source document 22.1 as indecomposable area (IDA) 26 in a step S100, wherein the indecomposable area (IDA) 26 can be processed as a whole content only. In step S110 an indecomposable area (IDA) object 34 is created by generating signature data for the indecomposable area (IDA) 26, and assigning the signature data to the indecomposable area (IDA) 26. In step S115 it is checked, if registration of the indecomposable area (IDA) object 34 is required. If registration of the indecomposable area (IDA) object 34 is required the content creator application 32 starts registering the indecomposable area (IDA) object 34 in step S120. The indecomposable area (IDA) object 34 may consist of a plurality of defined areas which are selected and associated by the content creator application 32. In step S120, registration data for the indecomposable area (IDA) object 34 are generated by assigning a computed checksum and creator identification (ID) to the indecomposable area (IDA) object 34, for example. In step S130 the registration data are encrypted and sent to the authentication application 5.1 with additional information like date of registration and IDA object identification (ID), for example. The authentication application 5.1 decrypts the received IDA registration data in step S140 and registers the indecomposable area (IDA) object 34 in step S150, i.e. stores the registration data in the registration data base 5.2. After a successful registration, IDA registration information is encrypted in step S160 and sent back to the content creator application 32. The content creator application 32 receives and decrypts the IDA registration information in step S170, updates the associated indecomposable area (IDA) object 34 with the registration information in step S180. In step S190, the content creator application 32 stores the created and registered indecomposable area (IDA) object 34 in a content storage 3.1 or in the storage part 14C of the indecomposable area (IDA) clipboard enhancement 14 of the operating system 12. If registration of the indecomposable area (IDA) object 34 is not required, the content creator application 32 stores the created and unregistered indecomposable area (IDA) object 34 in the content storage 3.1 or in the storage part 14C of the indecomposable area (IDA) clipboard enhancement 14 of the operating system 12 in step S190.

Referring to FIGS. 1 and 5a, a user starts selection of an area in an electronic source document 22.1 using a user interface 20 in step S200. The electronic source document 22.1 may comprise plain data 25 and/or one or more indecomposable areas (IDA) 26 created by the content creator application 32. In the shown embodiment the electronic source document 22.1 comprises plain data 25 and one indecomposable area (IDA) 26. A user-selected area 24 of the electronic source document 22.1 represents an area requested by the user to fill in the corresponding electronic target document 22.2. In the shown embodiment, the user-selected area 24 contains one indecomposable area (IDA) 26 and plain data 25. So in step S210, the enhanced content reader application 40, 40A forms a request based on the user-selected and/or user-requested area 24. In step S220 the request containing a selected portion of the electronic source document 22.1 is sent to the enhanced content provider application 30, 30A.

Referring to FIGS. 1 and 5b, the enhanced content provider application 30, 30A receives the request and checks in step S230 if data of an indecomposable area (IDA) 26 were requested. If no data of an indecomposable area (IDA) 26 were requested the received plain data 25 are forwarded to step S300. In step S300 a requested object 36A is assembled. In this case, the requested object 36A comprises plain data 25 only, so only the plain data 25 are assembled as requested object 36A in step S300. If data of an indecomposable area (IDA) 26 were requested, the process is continued with step S240. In step S240 the data of a partly requested indecomposable area (IDA) 26 are completed to an indecomposable area (IDA) object 34. In step S250, it is checked if plain data 25 have been additionally requested. If no plain data 25 have been requested, only the indecomposable area (IDA) object 34 is forwarded to step S270. If plain data 25 have been additionally requested, the object is split in the indecomposable area (IDA) object 34 and the plain data 25 in step S260. Then the plan data 25 are forwarded to step S300, and the indecomposable area (IDA) object 34 is forwarded to step S270. In step S270, it is checked if the requesting content reader application 40, 40A is an IDA-enabled and/or enhanced content reader application 40, 40A or a regular content reader application 40A'. If a regular content reader application 40A' is requesting the object, a protected version of the requested indecomposable area (IDA) object 34 is generated in S280 and forwarded to step S300. In this case, the requested object 36A comprises the protected indecomposable area (IDA) object 34B and the plain data 25. If an enhanced content reader application 40, 40A is requesting the object, the indecomposable area (IDA) object 34 is encrypted in step S290 and the encrypted indecomposable area (IDA) object 34A is forwarded to step S300. In this case, the requested object 36A comprises the encrypted indecomposable area (IDA) object 34A and the plain data 25. The requested object 36A assembled in step S300 is sent to the requesting content reader application 40, 40A, 40A' in step S310.

Alternatively to the described order, the completing step S240 could be performed after the checking step S250. In this case, it is first checked in step S250, if plain data 25 are requested additionally. If no plain data 25 have been requested, the process is continued with step S240. If plain data 25 have been additionally requested, the object is split in the indecomposable area (IDA) data and the plain data 25 in step S260. Then the plain data 25 are forwarded to step S300, and the indecomposable area (IDA) data are forwarded to step S240. In step S240 the data of a partly requested indecomposable area (IDA) 26 are completed to an indecomposable area (IDA) object 34. The indecomposable area (IDA) object 34 is then forwarded to step S270, and so on.

Referring to FIGS. 1 and 5c, in step S320, an enhanced content reader application 40, 40A receives the requested object 36A sent by the enhanced content provider application 30, 30A and checks in step S330 if an indecomposable area (IDA) object 34 was received. If an indecomposable area (IDA) object 34 was received in step S330 the encrypted indecomposable area (IDA) object 34A is decrypted in step S340 and output and/or processed in step S350. If no indecomposable area (IDA) object 34 was received in step S320 the requested object 36A is output and/or processed in step S350. In step S350 the enhanced content reader application 40, 40A displays and/or replays the requested object 36A containing plain data 25 and/or the indecomposable area (IDA) 26. Additionally the enhanced content reader application 40, 40A allows processing of the indecomposable area (IDA) 26 of the indecomposable area (IDA) object 34, as long as the content of the indecomposable area (IDA) 26 remains unchanged.

FIGS. 1 and 5a to 5c show an enhanced content reader application 40, 40A only. If a regular content reader application 40A' requests the object from the enhanced content provider application 30, 30A, the plain data 25 of the requested object are displayed and/or processed by the regular content reader application 40A', and the protected indecomposable area (IDA) object 34B is output only by the regular content reader application 40A'. Processing of the protected indecomposable area (IDA) object 34B by the regular content reader application 40A' is not possibly. The encrypted indecomposable area (IDA) object 34A could be used as protected indecomposable area (IDA) object 34B. In this case, the generating step 280 in FIG. 5b may be omitted.

In the described embodiment, only data of one indecomposable area (IDA) 26 were part of the user-selected and/or user-requested area 24. If data of more than one indecomposable area (IDA) 26 are selected, steps S230 to S350 are performed for each indecomposable area (IDA) 26, which is at least partly selected and/or requested.

Referring to FIG. 6, the user selects an indecomposable area (IDA) object 34 to be verified in step S400, using the enhanced content reader application 40, and 40A. In step S410, verification data of the indecomposable area (IDA) object 34 are generated. The verification data consist of a computed checksum and the IDA object identification (ID), for example. The verification data of the indecomposable area (IDA) object 34 are encrypted in step S420 and sent to the authentication application 5.1. The authentication application 5.1 receives and decrypts the verification data of the indecomposable area (IDA) object 34 in step S430. In step S440, the verification data are compared with the corresponding registration data of the indecomposable area (IDA) object 34. With the verification data the authentication application 5.1 is able to check the integrity of the indecomposable area (IDA) 26 using the stored registration data, since the registration data of the specified indecomposable area (IDA) object 34 are given by their object identification (ID). After verification, the verification result data containing a check outcome, an indecomposable area (IDA) object creator identification (ID) and additional information, for example, are encrypted and sent back to the enhanced content reader application 40, 40A in step S450. The enhanced content reader application 40, 40A receives and decrypts the verification result data in step S460. In step S470 the verification result data are checked and evaluated.

Figure 7:
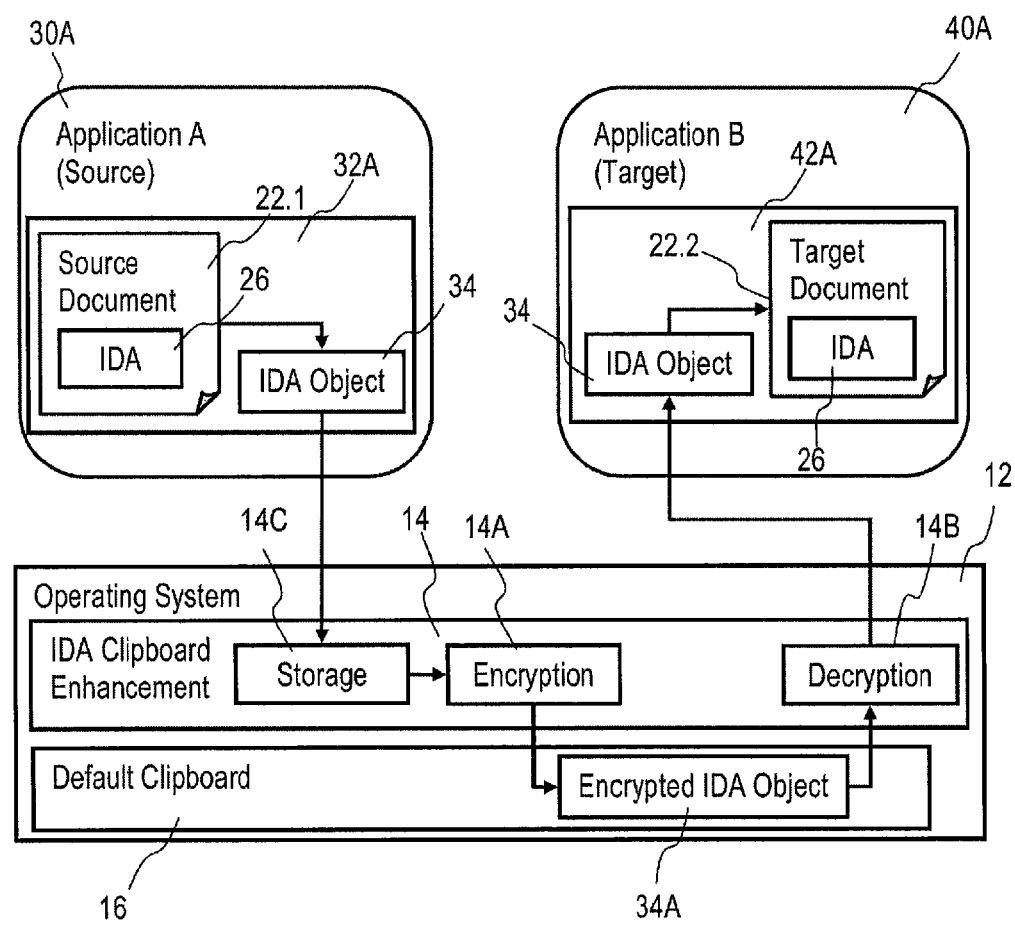
FIG. 7 is a schematic block diagram of the system for handling defined areas within an electronic document implemented in a local environment of FIG. 3 during a first transmitting process, in accordance with an embodiment of the present invention.
Figure 8:
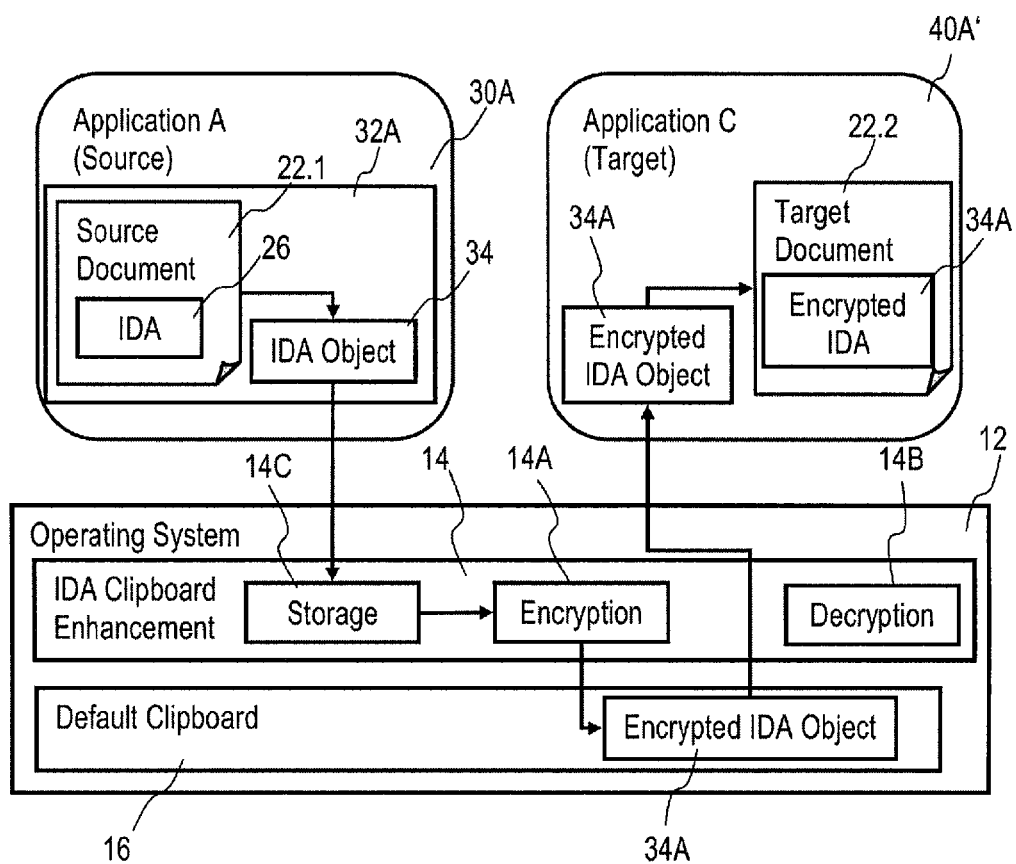
FIG. 8 is a schematic block diagram of the system for handling defined areas within an electronic document implemented in a local environment of FIG. 3 during a second transmitting process, in accordance with an embodiment of the present invention.

FIG. 7 shows the system for handling defined areas within an electronic document implemented in a local environment of FIG. 3 during a first transmitting process, in accordance with an embodiment of the present invention; and FIG. 8 shows the system for handling defined areas within an electronic document implemented in a local environment of FIG. 3 during a second transmitting process, in accordance with an embodiment of the present invention.

Referring to FIG. 7, two IDA-enabled applications 30A, 40A cooperate using the IDA clipboard enhancement 14 and a default clipboard 16 in the operating system 12. The user cuts or copies a part out of a source document 22.1 of a source application 30A. Because said part belongs to an indecomposable area (IDA) 26, the missing indecomposable area (IDA) content is completed and the IDA signature comprising the indecomposable area (IDA) object identification (ID), the indecomposable area (IDA) object creator identification (ID) and additional information, for example, is added by the IDA handling means 32A to create the corresponding indecomposable area (IDA) object 34. The indecomposable area (IDA) object 34 is stored in the storage part 14C of the IDA clipboard enhancement 14 and encrypted by the encryption part 14A in the IDA clipboard enhancement 14 implemented as clipboard layer, for example. The encrypted indecomposable area (IDA) object 34A is stored in a default clipboard 16. To paste back an indecomposable area (IDA) object 34 into an target document 22.2 of an IDA enabled target application 40A, the encrypted indecomposable area (IDA) object 34A stored in the default clipboard 16 is decrypted by the decryption part 14B of the IDA clipboard enhancement 14 and handed over to the IDA enabled target application 40A where the indecomposable area (IDA) object 34 is processed and/or inserted into the target document 22.2.

Referring to FIG. 8, an IDA enabled application 30A and a non-IDA enabled application 40A' cooperate using the IDA clipboard enhancement 14 and the default clipboard 16 in the operating system 12. The insertion of the encrypted indecomposable area (IDA) object 34A into the default clipboard 16 via the IDA clipboard enhancement 14 is depicted in FIG. 7. However pasting an encrypted indecomposable area (IDA) object 34A into a non-IDA enabled target application 40A' will result in pasting the non-readable, encrypted indecomposable area (IDA) object 34A into the target document 22.2. So in this case, the encrypted indecomposable area (IDA) object 34A is displayed as protected indecomposable area (IDA) object 34B.

Figure 9:
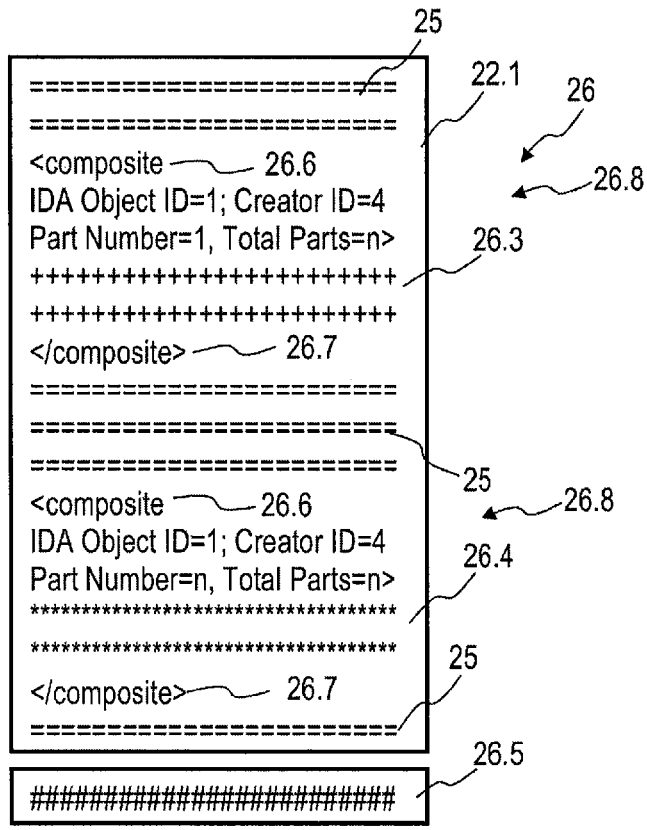
FIG. 9 is a schematic diagram of a first electronic document comprising plain data and an indecomposable area (IDA), in accordance with an embodiment of the present invention.
Figure 10:
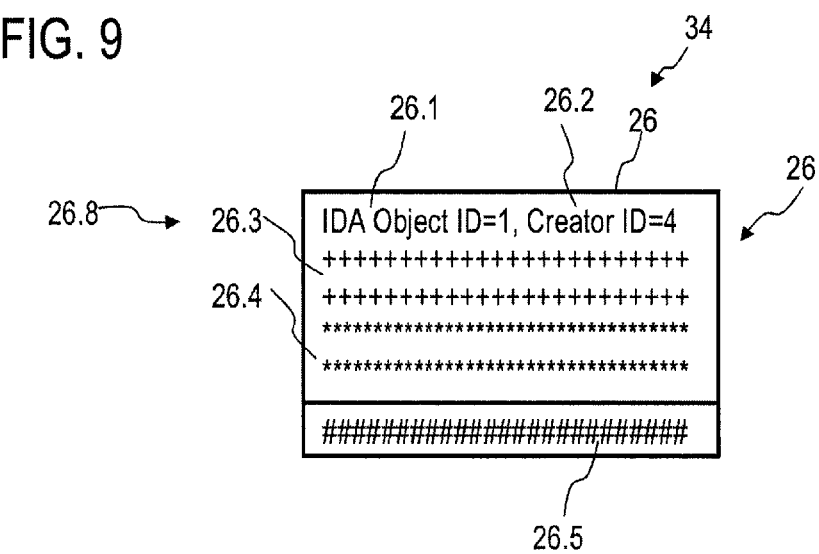
FIG. 10 is a schematic diagram of an indecomposable area (IDA) object created for the indecomposable area (IDA) shown in FIG. 9, in accordance with an embodiment of the present invention.

FIG. 9 shows a first electronic source document 22.1 comprising plain data 25, and an indecomposable area (IDA) 26, in accordance with an embodiment of the present invention; and FIG. 10 shows an indecomposable area (IDA) object 34 created for the indecomposable area (IDA) 26 shown in FIG. 9, in accordance with an embodiment of the present invention.

Referring to FIGS. 9 and 10, the shown electronic document 22.1 comprises plain data 25, and one indecomposable area (IDA) 26, comprising a number (n) of parts represented by a first composite part 26.3, and a second composite part 26.4. The content of the plain data 25 and/or the indecomposable area (IDA) 26 may be text, pictures, videos, sound and/or other selectable items. The elements of an indecomposable area (IDA) object 34 are the signature data 26.8, which in the shown embodiment comprise the indecomposable area (IDA) object identifier (IDA Object ID) 26.1, the indecomposable area (IDA) object creator identifier (Creator ID) 26.2, a marked area number (Part Number), and a total number of marked areas (Total Parts), the composite parts 26.3, 26.4 of the indecomposable area (IDA) 26 of the source document 22.1, and additional information 26.5, which comprise bibliography information, reference information, link information, etc. The indecomposable area (IDA) object identifier (IDA Object ID) 26.1, and the indecomposable area (IDA) object creator identifier (Creator ID) 26.2 can be manually assigned or be created automatically, e.g. as a hash value. The composite parts 26.3, 26.4 of the indecomposable area (IDA) 26 are each marked by a start marker 26.6, and an end marker 26.7.

FIG. 11 shows a second electronic target document 22.1 with a user-selected area 24 comprising plain data 25 and an indecomposable area (IDA) 26, in accordance with an embodiment of the present invention; and FIG. 12 shows the second electronic document shown in FIG. 11 with an indecomposable area (IDA) object 34 created for the indecomposable area (IDA) 26 shown in FIG. 11, in accordance with an embodiment of the present invention; and FIG. 13 shows a resulting selection area 28 comprising plain data 25 and the indecomposable area (IDA) 26 created for the user selected area 24 shown in FIG. 11, in accordance with an embodiment of the present invention.

Referring to FIGS. 11 to 13, the selection behavior of electronic source documents 22.1 with indecomposable areas (IDA) 26 is shown. The electronic source document 22.1 contains plain data 25 in line 1 to 3, line 6 to 8, and line b to d, and one indecomposable area (IDA) 26 comprising a first composite part 26.3 in lines 4 and 5, and a second composite part 26.4 in lines 9 and a. A user-selected area 24 includes the plain data 25 of lines 2 and 3 and data of line 4 of the first composite part 26.3 of the indecomposable area (IDA) 26. The user-selection 24 is internally extended to complete a corresponding indecomposable area (IDA) object 34 of the indecomposable area (IDA) 26, partly selected by the user.

Referring to FIG. 12, the indecomposable area (IDA) object 34 includes all composite parts 26.3, 26.4 of the indecomposable area (IDA) 26 with corresponding start and stop markers 26.6, 26.7, and signature data 26.8, and additional information 26.5. The resulting selection is shown in FIG. 13.

Referring to FIG. 13, a resulting selection area 28 created for the user selected area 24 comprises the plain data 25 of lines 2 and 3, the indecomposable area (IDA) 26 comprising the first composite part 26.3 with lines 4 and 5, and the second composite part 26.4 with lines 9 and a, and additional information 26.5.

Embodiments of the present invention can be implemented as an entirely software embodiment, or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A method for handling defined areas within an electronic document comprising:
marking at least one area in an electronic source document as an indecomposable area, wherein the indecomposable area can be processed as a whole content only in an electronic target document, the indecomposable area being associated with a context, and wherein the indecomposable area, when displayed in an electronic publication device, cannot be cut and copied to disassociate the indecomposable area from the context;
generating signature data for the indecomposable area;
assigning the signature data to the indecomposable area to create an indecomposable area object;
storing the indecomposable area object;
encrypting and transmitting the indecomposable area object in response to a request of an enhanced content reader application, the indecomposable area object comprising at least a part of the indecomposable area, wherein the enhanced content reader application decrypts the indecomposable area object and processes the indecomposable area in the electronic target document;
generating and transmitting a protected version of the indecomposable area in response to a request of a regular content reader application, the protected version of the indecomposable area comprising at least a part of the indecomposable area, wherein the regular content reader application outputs the protected version of the indecomposable area in the electronic target document;
generating registration data for the indecomposable area object and registering the indecomposable area object, wherein the registering comprises storing the registration data at an authentication application; and
generating verification data for the indecomposable area object and verifying the indecomposable area object, wherein the verifying comprises transmitting the verification data to the authentication application, comparing the verification data with the registration data, and creating a verification result based on the comparison.

2. The method according to claim 1, further comprising adding the registration information to the indecomposable area object.

3. The method according to claim 1, wherein at least one of: said signature data, said registration data, or said verification data for said indecomposable area, comprise at least one of: an indecomposable area object identification, a creator identification, a marked area number (Part Number), a total number of marked areas (Total Parts), or a computed checksum.

4. The method according to claim 1, wherein a start marker and an end marker are used to mark said at least one area in said electronic source document as indecomposable area.

5. The method according to claim 1, wherein additional information is added to said indecomposable area object comprising at least one of bibliography information, reference information, link information, or plain data.

6. A system for handling defined areas within an electronic document comprising:
a memory comprising a content creator application, at least one enhanced content provider application, and at least one content reader application;
a processor in communication with the memory, wherein the system is configured to perform a method comprising:
marking at least one area in an electronic source document as an indecomposable area, wherein the indecomposable area can be processed as a whole content only in an electronic target document, the indecomposable area being associated with a context, and wherein the indecomposable area, when displayed in an electronic publication device, cannot be cut and copied to disassociate the indecomposable area from the context;
generating signature data for the indecomposable area;
assigning the signature data to the indecomposable area to create an indecomposable area object;
storing the indecomposable area object;
encrypting and transmitting the indecomposable area object in response to a request of an enhanced content reader application, the indecomposable area object comprising at least a part of the indecomposable area, wherein the enhanced content reader application decrypts the indecomposable area object and processes the indecomposable area in the electronic target document;
generating and transmitting a protected version of the indecomposable area in response to a request of a regular content reader application, the protected version of the indecomposable area comprising at least a part of the indecomposable area, wherein the regular content reader application outputs the protected version of the indecomposable area in the electronic target document;
generating registration data for the indecomposable area object and registering the indecomposable area object, wherein the registering comprises storing the registration data at an authentication application; and
generating verification data for the indecomposable area object and verifying the indecomposable area object, wherein the verifying comprises transmitting the verification data to the authentication application, comparing the verification data with the registration data, and creating a verification result based on the comparison.

7. The system according to claim 6, the registering further comprising returning registration information to said content creator application and adding said registration information to said indecomposable object.

8. The system according to claim 6, wherein said content creator application uses at least one of an indecomposable area object identification, a creator identification, a marked area number (Part Number), a total number of marked areas (Total Number), or a computed checksum to create at least one of said signature data, or said registration data, and said at least one enhanced content reader application uses at least one of an indecomposable area object identification, a creator identification, a marked area number (Part Number), a total number of marked areas (Total Number), or a computed checksum to create said verification data for said indecomposable area.

9. The system according to claim 6, wherein said content creator application uses a start marker and an end marker to mark said at least one area in said electronic source document as indecomposable area, and adds additional information to said indecomposable area object comprising at least one of bibliography information, reference information, link information and plain data.

10. The system according to claim 6, wherein in a distributed environment said content creator application and said at least one enhanced content provider application are implemented on a content server, and said authentication application is implemented on an authentication server, and said at least one enhanced content reader application is implemented on a user client.

11. The system according to claim 6, wherein in a local environment said content creator application is implemented as indecomposable area handling means in an enhanced source application and as part of a clipboard enhancement of an operating system, and said at least one enhanced content provider application is implemented as part of said clipboard enhancement of said operating system, and said at least one enhanced content reader application is implemented as part of said clipboard enhancement of said operating system and as indecomposable area handling means in an enhanced target application.

12. A computer program product for handling defined areas within an electronic document, the computer program product comprising:

a non-transitory computer-readable storage medium readable by a processor and storing instructions for execution by the processor for performing a method comprising:

marking at least one area in an electronic source document as an indecomposable area, wherein the indecomposable area can be processed as a whole content only in an electronic target document, the indecomposable area being associated with a context, and wherein the indecomposable area, when displayed in an electronic publication device, cannot be cut and copied to disassociate the indecomposable area from the context;

generating signature data for the indecomposable area;

assigning the signature data to the indecomposable area to create an indecomposable area object;

storing the indecomposable area object;

encrypting and transmitting the indecomposable area object in response to a request of an enhanced content reader application, the indecomposable area object comprising at least a part of the indecomposable area, wherein the enhanced content reader application decrypts the indecomposable area object and processes the indecomposable area in the electronic target document;

generating and transmitting a protected version of the indecomposable area in response to a request of a regular content reader application, the protected version of the indecomposable area comprising at least a part of the indecomposable area, wherein the regular content reader application outputs the protected version of the indecomposable area in the electronic target document;

generating registration data for the indecomposable area object and registering the indecomposable area object, wherein the registering comprises storing the registration data at an authentication application; and generating verification data for the indecomposable area object and verifying the indecomposable area object, wherein the verifying comprises transmitting the verification data to the authentication application, comparing the verification data with the registration data, and creating a verification result based on the comparison.

* * * * *